(12) United States Patent
Balk (10) Patent No.: US 7,775,344 B2
(45) Date of Patent: Aug. 17, 2010

(54) DEVICE FOR BUFFERING PRODUCTS AND A METHOD OF OPERATING THIS

(75) Inventor: Wouter Balk, Baambrugge (NL)

(73) Assignee: Specialty Conveyor B.V., Zwaag (NL)

( * ) Notice: Subject to any disclaimer, the term of this patent is extended or adjusted under 35 U.S.C. 154(b) by 243 days.

(21) Appl. No.: 12/096,472

(22) PCT Filed: Dec. 8, 2006

(86) PCT No.: PCT/NL2006/000628

§ 371 (c)(1),
(2), (4) Date: Jun. 6, 2008

(87) PCT Pub. No.: WO2007/067049

PCT Pub. Date: Jun. 14, 2007

(65) Prior Publication Data

US 2008/0308386 A1  Dec. 18, 2008

(30) Foreign Application Priority Data

Dec. 8, 2005  (NL) ................................ 1030617

(51) Int. Cl.
*B65G 21/18* (2006.01)
*B65G 47/51* (2006.01)
(52) U.S. Cl. .................... 198/778; 198/575; 198/579
(58) Field of Classification Search .......... 198/778, 198/370.02, 860.3, 860.5, 460.1, 461.1, 572, 198/575, 577, 579
See application file for complete search history.

(56) References Cited

U.S. PATENT DOCUMENTS 3,983,989 A * 10/1976 Wahren ................. 198/778
5,490,589 A * 2/1996 Golz et al. ............. 198/444

(Continued)

FOREIGN PATENT DOCUMENTS

DE  10312695 A1  10/2004

(Continued)

OTHER PUBLICATIONS

Official Search Report of the European Patent Office Patent Office in counterpart foreign application No. PCT/NL2006/000628 filed Dec. 8, 2006.

(Continued)

*Primary Examiner*—Douglas A Hess
(74) *Attorney, Agent, or Firm*—Steven M. Koehler; Westman, Champlin & Kelly, P.A.

(57) ABSTRACT

A device for buffering products comprises a plurality of accumulating conveyors, each having a supplying place for receiving products and a discharging place for discharging products. The device further comprises an adjustable diverter which is connectable to a supplying conveyor for supplying the products in at least one flow. The diverter is connected to a selected one of the supplying places of the accumulating conveyors for conveying the flow of products to the corresponding accumulating conveyor. The device further comprises a merging member which is connectable to a discharging conveyor for conveying the products in at least one flow. The merging member is connected to a selected one of the discharging places of the accumulating conveyors for conveying the products from the corresponding accumulating conveyor to the discharging conveyor. The accumulating conveyors (1) form at least a helical path, which results in a compact device.

28 Claims, 10 Drawing Sheets

U.S. PATENT DOCUMENTS

| | | | |
|---|---|---|---|
| 5,833,045 A * | 11/1998 | Osti et al. | 198/444 |
| 6,241,074 B1 * | 6/2001 | Steeber | 198/456 |
| 6,523,677 B1 * | 2/2003 | DeGennaro et al. | 198/778 |
| 6,666,322 B2 * | 12/2003 | Biondi et al. | 198/347.1 |
| 6,725,998 B2 * | 4/2004 | Steeber et al. | 198/347.4 |
| 7,032,742 B2 * | 4/2006 | Hartness et al. | 198/594 |
| 7,163,099 B2 * | 1/2007 | Mueller | 198/347.3 |
| 7,165,670 B2 * | 1/2007 | Shefet et al. | 198/778 |
| 7,191,896 B2 * | 3/2007 | Hartness et al. | 198/594 |
| 7,252,189 B2 * | 8/2007 | Yagi | 198/690.1 |
| 7,299,589 B2 * | 11/2007 | Campbell et al. | 52/118 |

FOREIGN PATENT DOCUMENTS

| | | |
|---|---|---|
| EP | 1389595 A | 2/2004 |
| FR | 2769010 A1 | 4/1999 |
| GB | 1084200 A | 8/1917 |

OTHER PUBLICATIONS

Written opinion of the European Patent Office Patent Office in counterpart foreign application No. PCT/NL2006/000628 filed Dec. 8, 2006.

* cited by examiner

DEVICE FOR BUFFERING PRODUCTS AND A METHOD OF OPERATING THIS

BACKGROUND

The discussion below is merely provided for general background information and is not intended to be used as an aid in determining the scope of the claimed subject matter.

Aspects of the present invention relate to a device for buffering products on a conveyor.

Such a device is known from the German patent application DE 103 12 695 A1. The known device is a buffering device for buffering products which are conveyed to a production machine. The buffering device will store products on buffering tracks if the supplied product flow is higher than the intake flow capacity of the production machine. This may happen, for example, during a period of lower production speed of the production machine or a breakdown of the machine. The known device comprises several buffering tracks, which are driven independently from each other to move products continuously along a conveying track to the production machine.

SUMMARY

This Summary and Abstract are provided to introduce some concepts in a simplified form that are further described below in the Detailed Description. This Summary and Abstract are not intended to identify key features or essential features of the claimed subject matter, nor are they intended to be used as an aid in determining the scope of the claimed subject matter. In addition, the description herein provided and the claimed subject matter should not be interpreted as being directed to addressing any of the short-comings discussed in the Background.

In a one aspect, accumulating conveyors form at least a helical path. The advantage of the helical path is that the ratio between path length of the accumulating conveyors and the occupied surface of a helix as seen in a direction parallel to the axis of the helix is high. A compact buffering device is also beneficial when products on the accumulating conveyor need a heating or cooling treatment. For example, a cooling room is preferably as small as possible from a point of view of energy consumption. Besides, the helical shape of the accumulating conveyors provides the opportunity to arrange the conveyors such that effective heating or cooling treatment of the products is achieved by transferring a heating or cooling fluid between adjacent conveyor paths as seen along the axis of the helix. Furthermore, the helical shape is useful for bridging a distance in a direction parallel to the central axis of the helix.

One of the supplying places of the corresponding accumulating conveyor can be selected by means of controlling a diverter. One of the discharging places of the corresponding accumulating conveyor can be selected by means of controlling a merging member.

In an embodiment the accumulating conveyors are disposed parallel to each other within at least the helical path, because this provides a more efficient use of the helical path. It is, for example, possible to have a plurality of accumulating conveyors adjacent to each other following the helical path.

The helical path may have a central axis, and the supplying place and discharging place of at least one accumulating conveyor may be spaced from each other in a direction parallel to the central axis of the helical path. This embodiment has the advantage of providing a bridging effect along the central axis, which is useful under certain circumstances.

In an alternative embodiment of the device for buffering products the accumulating conveyors form at least two helical paths which are arranged in series. The supplying place and the discharging place of at least one accumulating conveyor may be in a plane which is substantially perpendicular to the central axis, which is substantially parallel of the helical paths. This embodiment is useful in a case wherein no distance has to be bridged along the central axis of the helical path.

In another embodiment the central axis of the helical path extends in upright direction. This means that the products are moved in a vertical direction along the helical path. The advantage of this embodiment is that a relatively small floor space is needed for the accumulating conveyors, such that a compact device for buffering products is provided. Besides, the embodiment provides the opportunity to bridge a height which is sometimes required in a conveying process. This may be the case, for example, when products come from a depalletising station which often discharges the products at a high level. When a production machine which is located downstream and at a lower level than the outlet of the depalletising station, the buffering device having a helical shape has the function of buffering products as well as bridging the height. The same benefit will be achieved when a height has to be bridged upwardly, such as in the case of a palletising station of which a product intake may be located downstream and at a higher level than the outlet of a production machine.

The accumulating conveyors which form helical paths may be disposed in parallel to each other.

This means that several helical paths may be formed in parallel and/or in series.

Each of the accumulating conveyors may form at least a helical path. In this case the accumulating conveyors together may form a more compact device for buffering than when certain accumulating conveyors have more flat-shaped accumulating conveyors, such as in the case when a helical path is bypassed by at a straight or somewhat bended accumulating conveyor, for example.

The helically shaped accumulating conveyor can comprise an endless conveyor member which is at least radially supported and guided by guide rollers. The conveyor member may comprise slats, for example, which can each be provided with at least a guide roller. The advantage of this embodiment is that it reduces friction between the conveyor member and a frame by which it is supported.

An accumulating conveyor may form two parallel tracks within the helical path, wherein the directions of conveyance in the tracks are opposite to each other. This provides the opportunity to use the same helical path for conveying products upwardly and downwardly through the helical path such that the products start and end at the same level. The advantage of this embodiment is a more efficient use of the helical path, hence improving its compactness.

In order to create a simple control system for controlling the device for buffering products, at least a sensor is disposed near at least a discharging place so as to detect whether a product is present at that location.

The diverter may be a line diverter, in which the direction of conveyance is kept the same, whereas products thereon are displaced transversely, such that the products are aligned with the accumulating conveyors. The advantage of a line diverter is that products which are difficult to guide are conveyed reliably.

Another aspect of the invention relates to a method of operating the above-mentioned device, wherein at least a product arriving at the diverter is engaged by an engaging mechanism, then transferred to the selected one of the supplying places of the accumulating conveyors, where the product is disengaged. The advantage of this method is that a product is displaced over a possible gap between the diverter and the supplying places of the accumulating conveyors. The engaging mechanism may be a clamping mechanism.

In order to obtain a stable transfer of products to the supplying places the product speed and direction before disengagement of the product are synchronized with the speed and direction of conveyance of the selected accumulating conveyor at the corresponding supplying place, respectively.

BRIEF DESCRIPTION OF THE DRAWINGS

The invention and advantages thereof will now be explained in more detail with reference to the very schematic drawings.

FIG. 2A-F illustrate the buffering principle of the embodiment of FIG. 1.

DETAILED DESCRIPTION

Figure 1:
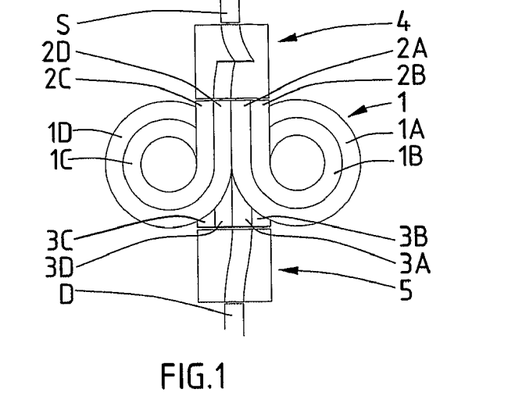
FIG. 1 is a very schematic plan view of an embodiment of a device for buffering products according to an aspect of the invention, wherein each of the helical paths has a central axis extending upright.

FIG. 1 shows an embodiment of a device for buffering products according to an aspect of the invention. Such a device is used, for example, for conveying products from one machine to a next one, wherein the discharging speed of the first machine may vary with respect to the supplying speed of the receiving machine. Conveyable products may be bottles, cans and pots, made of glass, plastic, metal and the like. Carton packs, carton liquid packs, bags, secondary packed items, shrink packs and pouches or also conceivable. The machines may be filling stations, machining stations, packaging stations, labelling stations, capping stations, molding stations, palletising and depalletising stations and the like. It is also possible to buffer newspapers, books, magazines and the like.

Particularly, but not limited thereto, the device according to an aspect of the invention is suitable to convey and buffer products which are already packed as single units, such as bottles or cans of which the necks or top sides are attached to each other, shrink-wrapped or carton-wrapped bottles, or bundled newspapers, magazines or books and the like. In practice, such products have to be conveyed from a secondary packaging machine to a palletising machine, for example.

FIG. 1 shows a schematic construction of an embodiment of the device for buffering products according to an aspect of the invention. The device comprises a plurality of accumulating conveyors 1. The embodiment has four accumulating conveyors 1A, 1B, 1C, 1D, but a higher or lower number of accumulating conveyors 1 is conceivable. The accumulating conveyors 1 are disposed parallel to each other.

Each of the accumulating conveyors 1A-D has a corresponding supplying place 2A-D for receiving products and a discharging place 3A-D for discharging products. The embodiment further comprises an adjustable diverter 4 which is connectable to a discharging end of a supplying conveyor S for supplying the products, preferably one-by-one. The products can be received by the diverter 4. The diverter 4 is arranged such and connected to a selected one of the supplying places 2A-D of the accumulating conveyors 1, that it conveys the flow of products to the selected one of the supplying places 2A-D of a corresponding accumulating conveyor 1A-D.

The embodiment such as shown in FIG. 1 further comprises a merging member 5 of which a discharging end is connectable to a supplying end of a discharging conveyor D for conveying the products in at least one flow. A supplying end of the merging member 5 is connected to a selected one of the discharging places 3A-D of the accumulating conveyors 1A-D for conveying the products from the corresponding accumulating conveyor 1 to the discharging conveyor D. The discharging conveyor D is arranged to convey the product flow further, for example, to a next machine. Thus, the products are conveyed from the supplying conveyor S to the discharging conveyor D via the diverter 4, the accumulating conveyors 1, and the merging member 5, respectively.

According to an aspect of the invention the accumulating conveyors 1 form at least a helical path, such as shown in the embodiment of FIG. 1. It should be noted that each of both helical paths in FIG. 1 comprises two parallel accumulating conveyors 1A, 1B and 1C, 1D, respectively. However, it is also possible to have only one accumulating conveyor 1 per helical path.

FIG. 2 illustrates the principle of the device for buffering products in a schematic way. Note, that the accumulating conveyors 1A-D are shown as elongated members instead of helical paths for clarity reasons. The accumulating conveyors 1 may have a variable speed, which is adjusted to the supplying speed (the conveying speed of the supplying conveyor S and/or the diverter 4) and the discharging speed (the conveying speed of the merging member 5 and the discharging conveyor D). The conveying speeds of the accumulating conveyors 1 are independent from each other and each accumulating conveyor may have its own driving device. The accumulating conveyors 1 may also be coupled to the diverter 4 or the merging member 5. Furthermore, each of the accumulating conveyors 1 may be arranged such that it can be stopped.

Figures 2A, 2B, 2C:
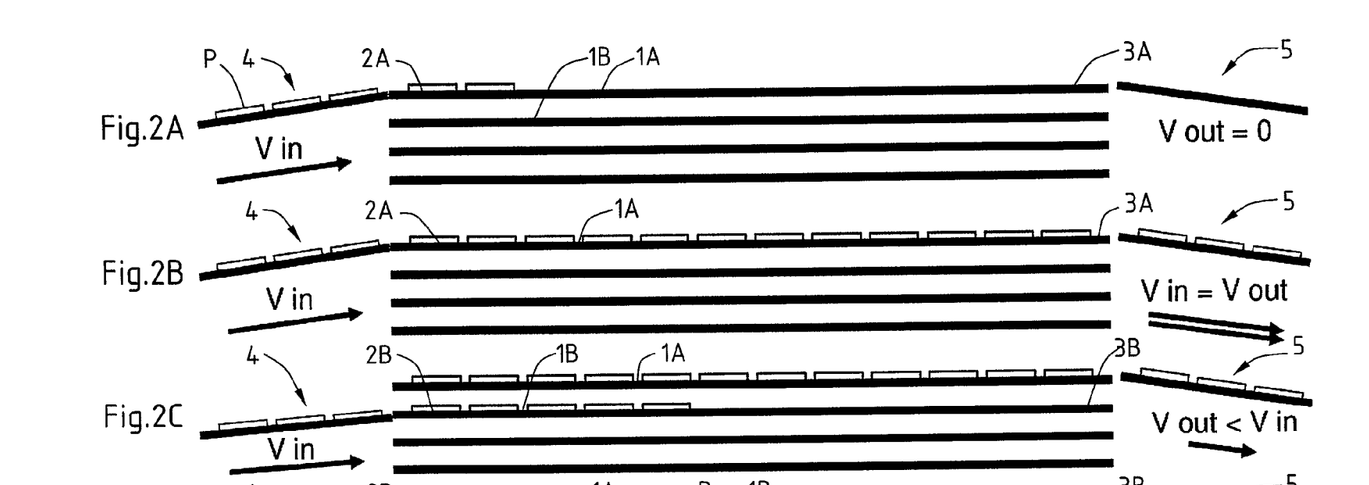

FIG. 2A shows the situation in which the discharging speed (Vout) is zero and the supplying speed (Vin) is higher than zero. This means that the accumulating conveyor 1A is filled.

FIG. 2B shows the situation in which the discharging speed (Vout) is equal to the supplying speed (Vin). This means that a product flow from the diverter 4 is conveyed to the merging member 5 along accumulating conveyor 1A.

FIG. 2C shows the situation in which the discharging speed (Vout) is lower than the supplying speed (Vin). This means that the products P are conveyed from the diverter 4 to the accumulating conveyor 1B which will be filled then.

Figures 2D, 2E, 2F:
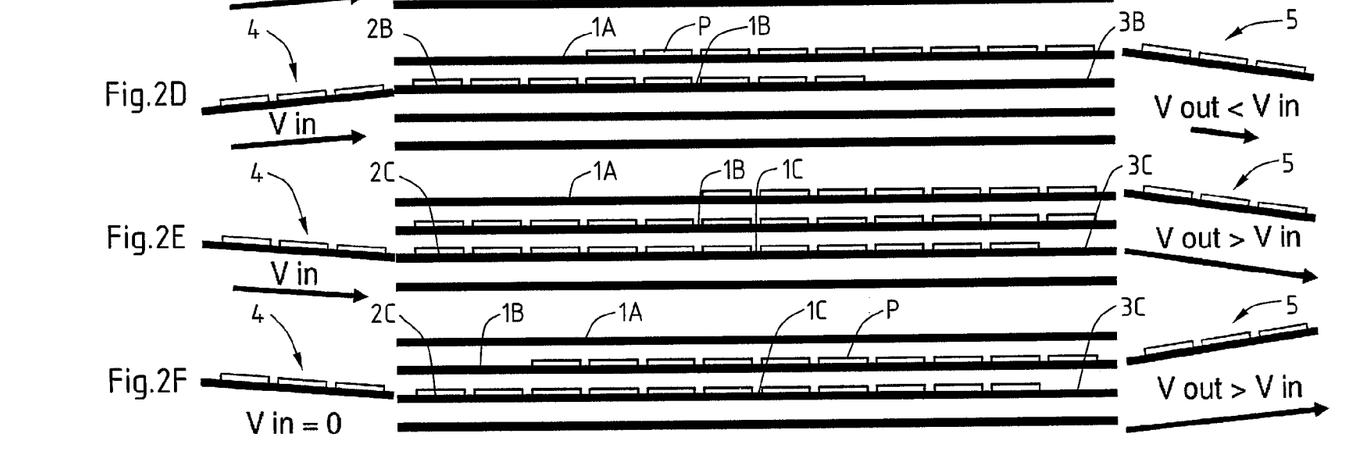

FIG. 2D shows the situation in which the accumulating conveyor 1A is discharged, whereas the accumulating conveyor 1B is filled at a supplying speed (Vin), which is higher than the discharging speed (Vout).

FIG. 2E shows the situation in which the accumulating conveyor 1B is entirely filled, whereas it is still impossible to discharge the accumulating conveyor 1B because the accumulating conveyor 1A is not discharged yet. Therefore, the accumulating conveyor 1B is stopped and the diverter 4 is adjusted such that the products are conveyed to the accumulating conveyor 1C, which will be filled than.

FIG. 2F shows the situation in which the discharging speed is already higher than the supplying speed and the products on the accumulating conveyor are discharged.

The merging member 5 is adjusted and connected to the accumulating conveyor 1B. The accumulating conveyor 1B is then driven at the conveying speed of the merging member 5. Even if the supplying speed is zero, such as shown, discharging may continue until the accumulating conveyors 1 are entirely discharged.

Preferably, the device for buffering is sufficiently filled such that always accumulated products are present at one of the discharging places 3A-D of the accumulating conveyors 1 for being discharged.

The device for buffering products may be arranged such that it functions according to the "first-in-first-out" principle. In that case the sequence of the conveyed products coming from the supplying conveyor S is maintained, which may be advantageous for fulfilling quality requirements en monitoring products after discharging. The device for buffering may also function in an alternative way, in which products leave the device in a sequence which is different from the sequence at the entrance of the device.

The embodiment of the device for buffering in FIG. 1 is provided with four accumulating conveyors 1A-D, divided into two helical paths which have substantially parallel central axes. Each of the helical paths comprises two parallel accumulating conveyors 1. The accumulating conveyor may be an endless conveyor member comprising slats or a conveying belt or the like. In an embodiment, the conveyor member within the helical path is radially supported by guide rollers (not shown) so as to reduce friction. In the embodiment of FIG. 1 both helical paths are mirrored with respect to a longitudinal plane of the device for buffering products. As a consequence, the supplying conveyor S and the discharging conveyor D are aligned as seen from above. However, the supplying conveyor S and the diverter 4, on one hand, and the discharging conveyor D and the merging member 5, on the other hand are disposed on a different level. In this case the supplying conveyor S and the diverter 4 are disposed at the upper side of the helical paths and the discharging conveyor D and the merging member 5 are disposed at the lower side of the helical paths. This may be beneficial in the case that a height difference should be bridged.

Figure 3:
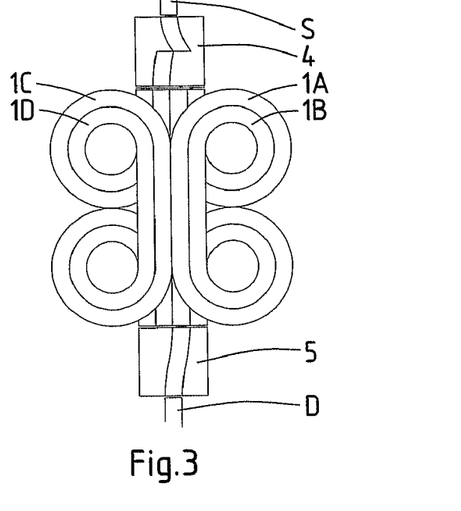
FIGS. 3-6, 8, 10-16 and 21 are similar views as FIG. 1, showing alternative embodiments of the device for buffering products of FIG. 1.

If such a height difference between the discharging end of the supplying conveyor S and the supplying end of the discharging conveyor is not desired the embodiment such as shown in FIG. 3 may be suitable. In this embodiment two helical paths are disposed in series and mirrored in a longitudinal plane, resulting in four helical paths, each path comprising two parallel accumulating conveyors 1. In this case the products coming from the supplying conveyor S are first moved upwardly in the first helical paths and than moved downwardly in the next helical paths disposed downstream of the first helical paths. As a consequence, the products leave the device for buffering products at substantially the same level as they enter it.

Figure 4:
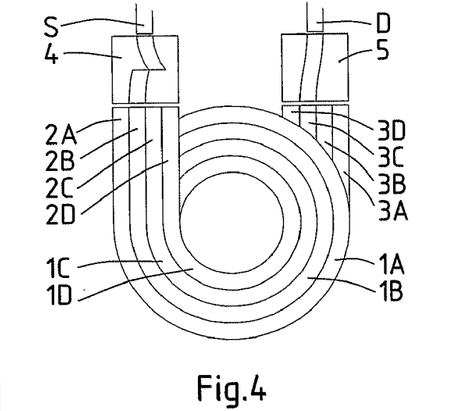

FIG. 4 shows another embodiment, in which the four accumulating conveyors 1A, 1B, 1C, 1D are parallel to each other in a single helical path. Furthermore, the supplying place 2A-D of the accumulating conveyors 1 and the discharging place 3A-D of the accumulating conveyors 1 are disposed at similar sides of the device but have a height difference between the supplying conveyor S and the discharging conveyor D. This means that the products are supplied and discharged in opposite directions of conveyance.

Figure 5:
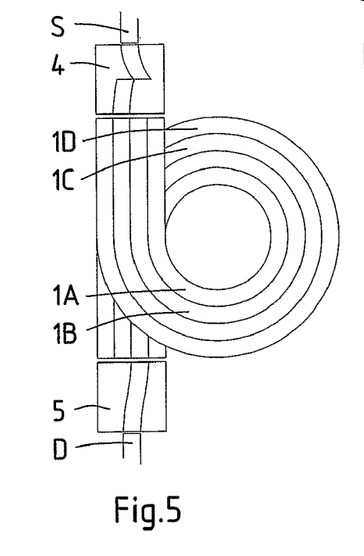

FIG. 5 shows an alternative embodiment of the device for buffering a product of which the helical path is similar to one of the helical paths of FIG. 1, but in this case the single helical path comprises four accumulating conveyors 1A-D. The supplying conveyor S and the discharging conveyor D are aligned as seen from above, but the supplying conveyor S and the discharging conveyor D have a different height level.

Figure 6:
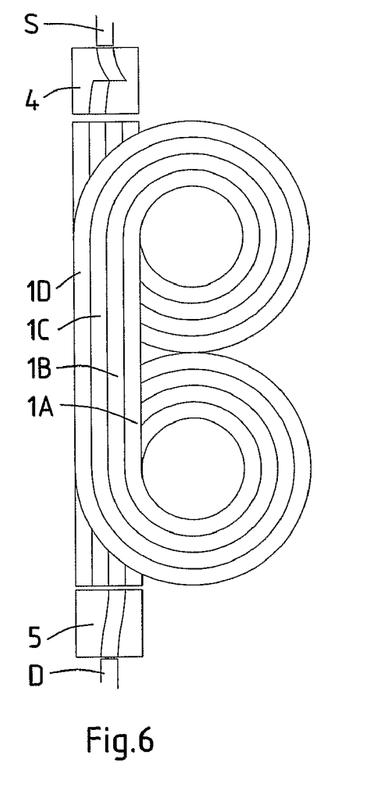

FIG. 6 shows an alternative embodiment of which two helical paths are disposed in series. The embodiment is compareable to that of FIG. 3, but now both helical paths comprises four accumulating conveyors 1A-D.

Figures 7A, 7B:
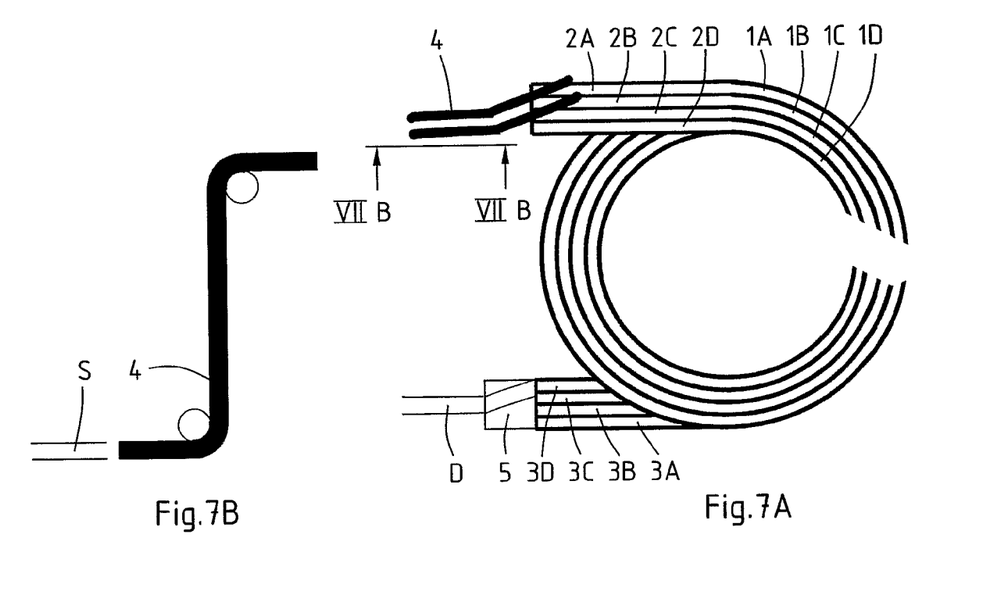
FIGS. 7a and 9a are similar views as FIG. 1, showing alternative embodiments of the device for buffering products of FIG. 1.
FIGS. 7b and 9b are side views along the lines VIIb-VIIb in FIG. 7a and IXb-IXb in FIG. 9a, respectively.

FIG. 7a shows an alternative embodiment in which the diverter 4 is formed as a wedge conveyor. In this type of conveyor a product can be engaged between flexible belts and conveyed in the direction of conveyance. It is particularly suitable for conveying small products in a flexible way. The products should allow some external pressure, which is the case with bottles, boxes and crates, for example. The advantage of a wedge conveyor is that it provides the opportunity to torsional movement of the products along the direction of conveyance, particularly in the vertical part, such as shown in FIG. 7b. It is also a simple system to bridge a height difference which may be present between the supplying places 2A-D and the discharging places 3A-D of the accumulating conveyors 1, respectively. Furthermore, the merging member 5 formed as a wedge conveyor is conceivable, as well. Due to the high degree of flexibility of the wedge conveyor it is possible to move the discharging end of the diverter 4 towards the different supplying places 3.

Figure 8:
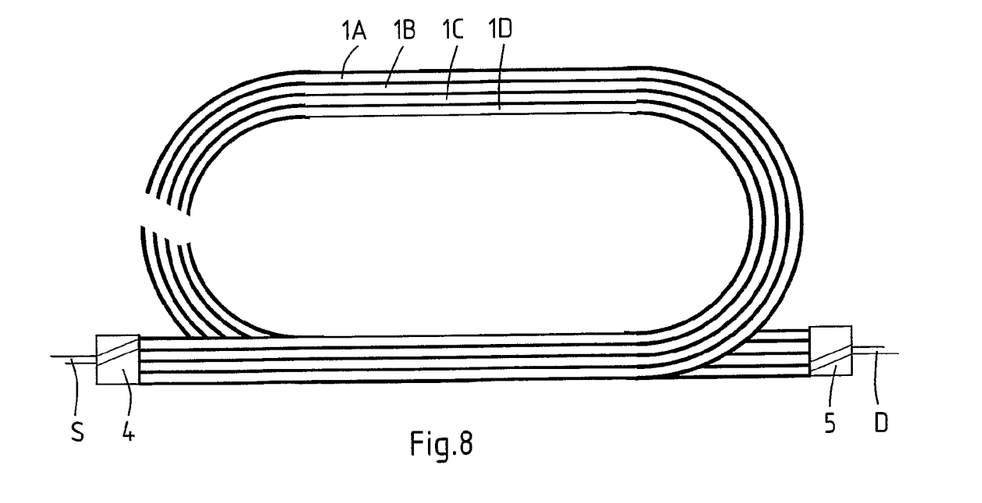

FIG. 8 shows an alternative embodiment of the device for buffering, having a helical path which has an oval shape. In this embodiment the inclination of the helical path may be limited to the straight portions of the helical path.

Figure 9A:
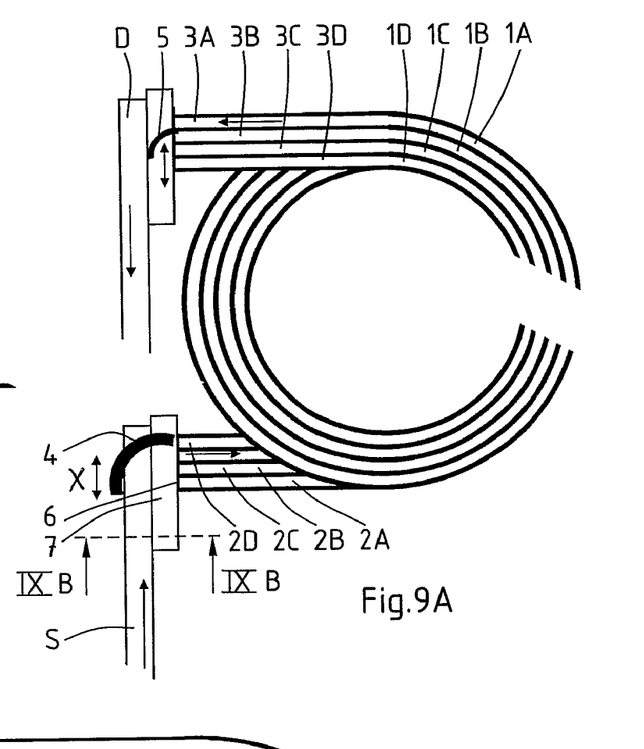

In the embodiment such as shown in FIG. 9a the product flow which comes from the supplying conveyor S is diverted by diverter 4. This embodiment is typically suitable for products having different shapes such as products in bags or conical products, for example. The diverter 4 is a guide in this case and the products are guided to one of the supplying places 2A-D of the corresponding accumulating conveyors 1. The products are guided by the internal surface of the arc-shaped diverter 4. One of the accumulating conveyors 1A-D can be selected by adjusting the diverting guide in one of the opposite directions indicated by the double-headed arrow X. The merging member 5 is also formed as a guide, but the products are guided along the outer side of the arc-shaped guide. The arc-shaped guides 3, 4 and the merging member 5 may be driven guides, for example driven endless conveying belts.

Figure 9B:
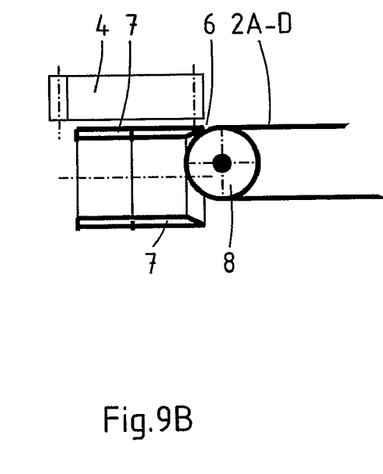

In order to prevent products from tilting or falling down due to crossing a gap 6 between the supplying places 2A-D of the accumulating conveyors 1 and the diverter 4, a cover is present for covering a gap between the supplying places 2 and a discharging end of the diverter 4. In the embodiment of FIG. 9 the covers are formed by a rotating endless conveyor belt 7 which has a direction of conveyance perpendicular to that of the accumulating conveyors 1 in the supplying places 2. The accumulating conveyors have a revolving wheel 8 supporting an endless carrying surface of the accumulating conveyor at a location upstream of the supplying places 2. A side edge of an upper part of the conveyor belt 7 extends substantially parallel to a center line of the revolving wheel 8. Furthermore the side edge is disposed above the wheel 8 at such a position that an upper surface of the conveying belt 7 is substantially flush with and close to an upper surface of the accumulating conveyors 1 at the supplying places 2, see FIG. 9b. The conveying belt 7 such as shown in FIG. 9b has a sharp side edge, which means that the thickness of the conveying belt 7 decreases to the side edge. Such a product conveyor belt 7 may be arranged in a similar way at a transfer region between the discharging place 3A-D of the accumulating conveyors 1 and the merging member 5. Note, that the arc-shaped diverter 4 and the arc-shaped merging member 5 may also be straight guides. Covering the gap 6 is also advantageous to prevent tiny products from falling through the gap 6.

Figure 10:
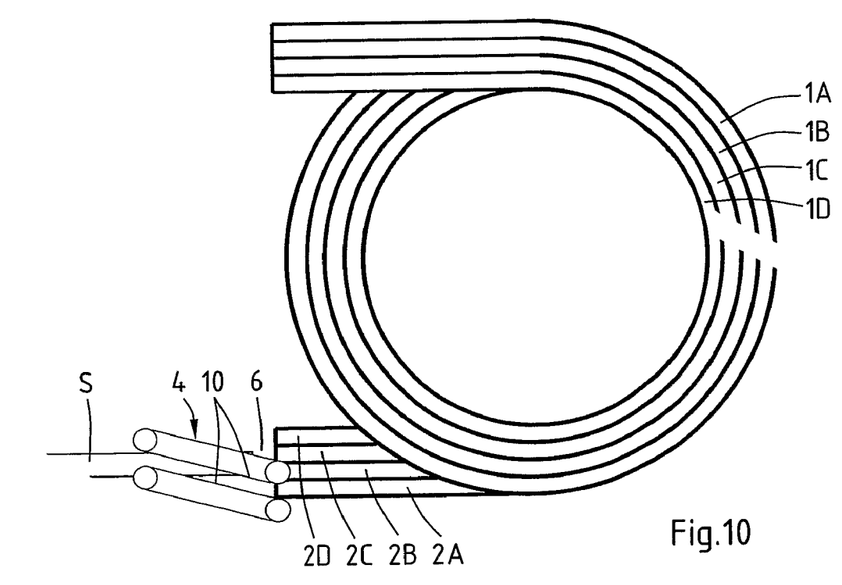

FIG. 10 shows an alternative embodiment having a clamping mechanism as diverter 4 for clamping a product coming from the supplying conveyor S and conveying it over the gap 6 between the diverter 4 and the supplying places 2A-D of the accumulating conveyors 1. The clamping mechanism comprises two circulating parallel endless conveying belts 10 between which belts 10 the products can be clamped and conveyed. This embodiment is typically suitable for conveying products having substantially similar dimensions and/or products which are relatively small. The clamping mechanism may also be applied to the merging member 5.

Figure 11:
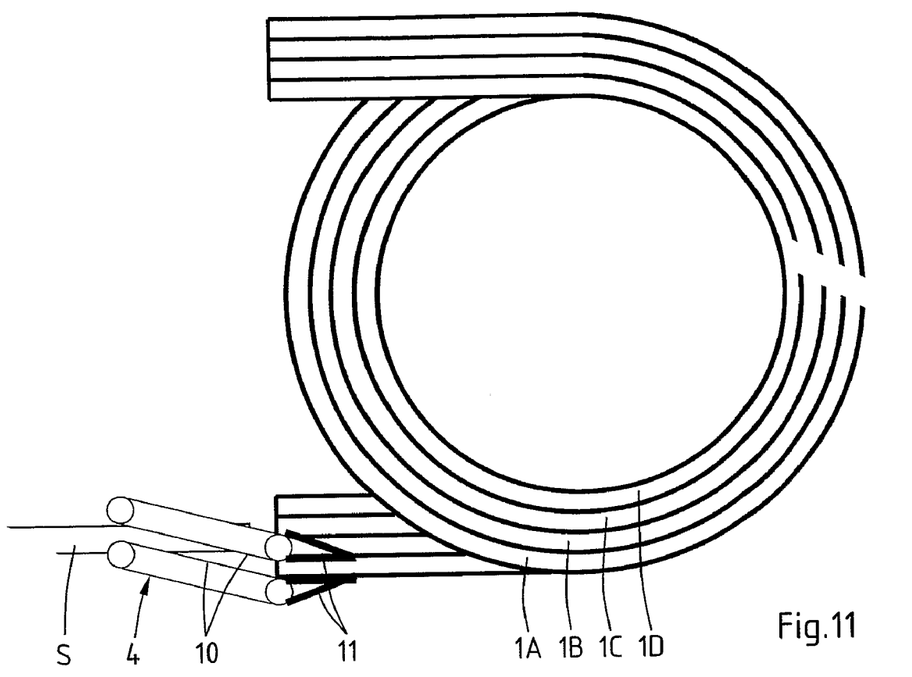

FIG. 11 shows an embodiment comparable to that of FIG. 10, but the clamping mechanism is provided with a guiding device 11 for directing the products which are put on the accumulating conveyor in a desired orientation. The guide 11 is arranged such that it maintains the appropriate orientation. This is useful for guiding circular products, for example. It is also possible to apply such a guiding device 11 as the merging member 5 for receiving the products and give them a desired orientation before they arrive at the discharging conveyor D. The guiding device may be made of flexible elements, such as flexible flaps.

Figure 12:
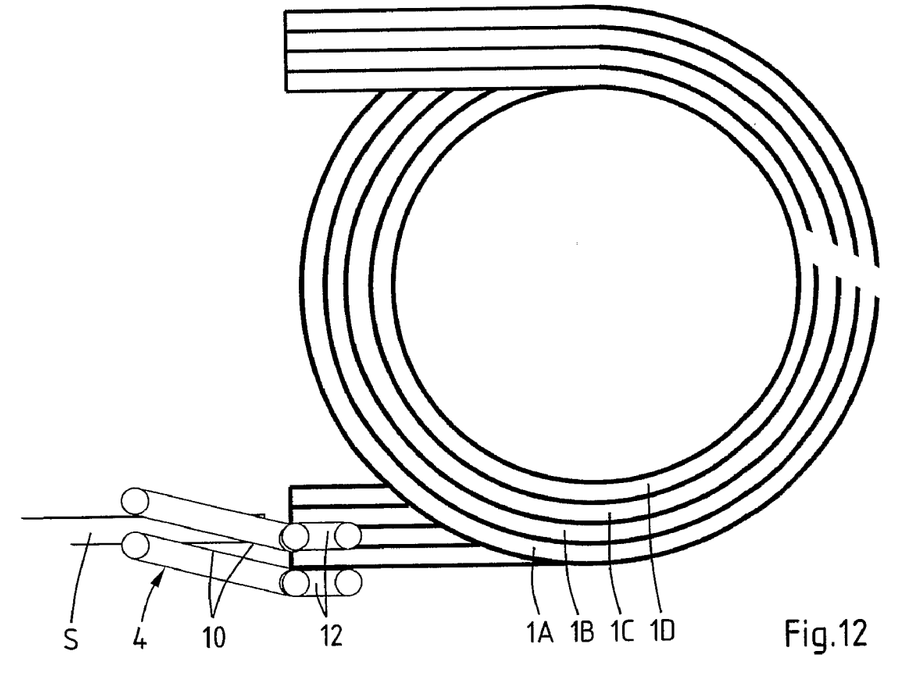

FIG. 12 shows a similar embodiment as FIG. 11, but the guiding device 11 is replaced by two circulating parallel endless conveying belts 12 between which belts 12 the products can be clamped. This embodiment may synchronize the speed of the products put on the accumulating conveyor with respect of the conveying speed of the corresponding accumulating conveyor 1A-D. Furthermore, the belts 12 may be stopped during switching to another accumulating conveyor by the diverter 4. This avoids the situation such as shown in FIG. 11, that during switching, a product is moved by one of the accumulating conveyors 1 which may cause instability for certain types of products.

Figure 13:
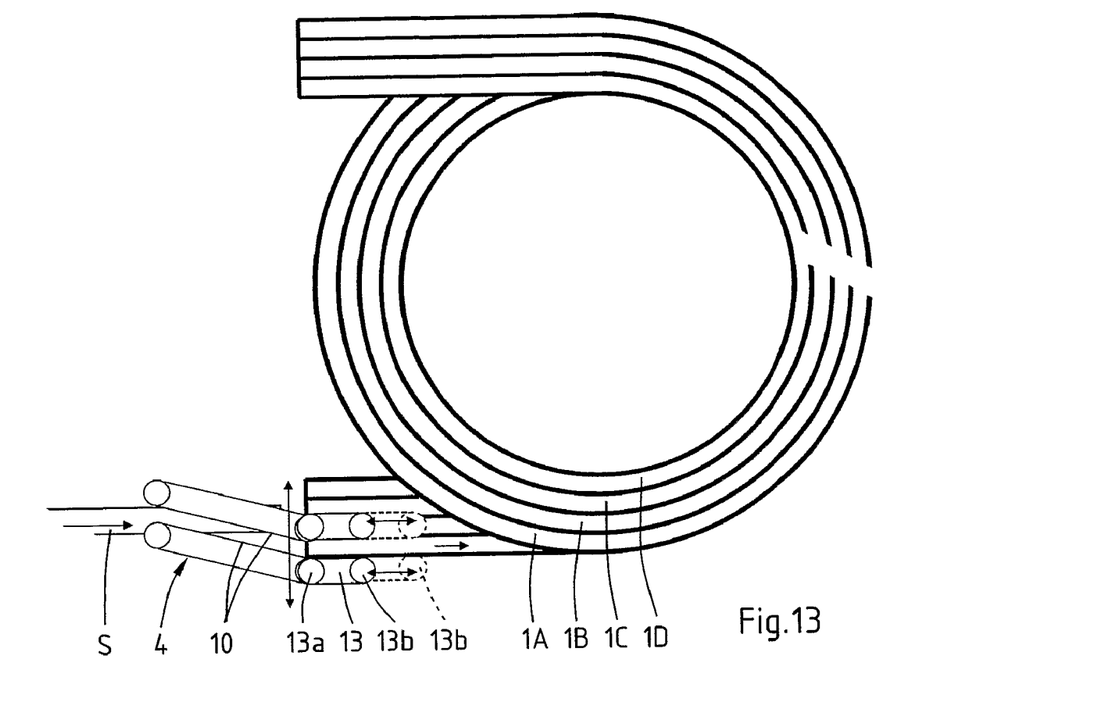

FIG. 13 shows an embodiment comparable to that shown in FIG. 12, but the diverter 4 is provided with a telescopic mechanism 13 to prevent blocking of the flow upstream of the diverter 4 when the diverter 4 changes its position in order to convey the products to one of the other accumulating conveyors 1A-D. The telescopic mechanism 13 comprises parallel conveyor belts and the distance between revolving wheels 13a, 13b can be adjusted in a known way, such that the product can be clamped between the belts as well as displaced by displacing the revolving wheels from each other, hence elongating the belts. Revolving wheel 13b is movable with respect to revolving wheel 13a which has a substantially fixed position with respect to the accumulating conveyors in the direction of conveyance. After disengaging a product on the selected accumulating conveyor 1 the revolving wheels 13b can be moved back towards revolving wheels 13a. This embodiment is suitable for maintaining a continuous product flow during changing of selected accumulating conveyor 1A-D as the conveyor belt of the telescopic mechanism 13 does not need to be stopped during switching of the diverter 4, hence avoiding accumulating pressure in the upstream product flow due to accumulation of products.

The clamping mechanism such as shown in different variations in FIG. 10-13 are typically suitable to convey products which have similar dimensions, for example bottles, which may be engaged below the bottle neck by the mechanism 10-13 or products having a conical shape may be engaged by transversely inclined belts. The product may be engaged by clamping, but also by means of vacuum or in a magnetic way. In each manner a product is engaged by the engaging mechanism, then transferred to the selected one of the supplying places 2 of the accumulating conveyors 1, where the product is disengaged. The engaging mechanism may be a clamping mechanism which means that the products should allow a certain degree of external pressure. Alternatively, it is also possible to apply a clamping mechanism having a very flexible clamping surface for products which accept less external pressure.

Figure 14:
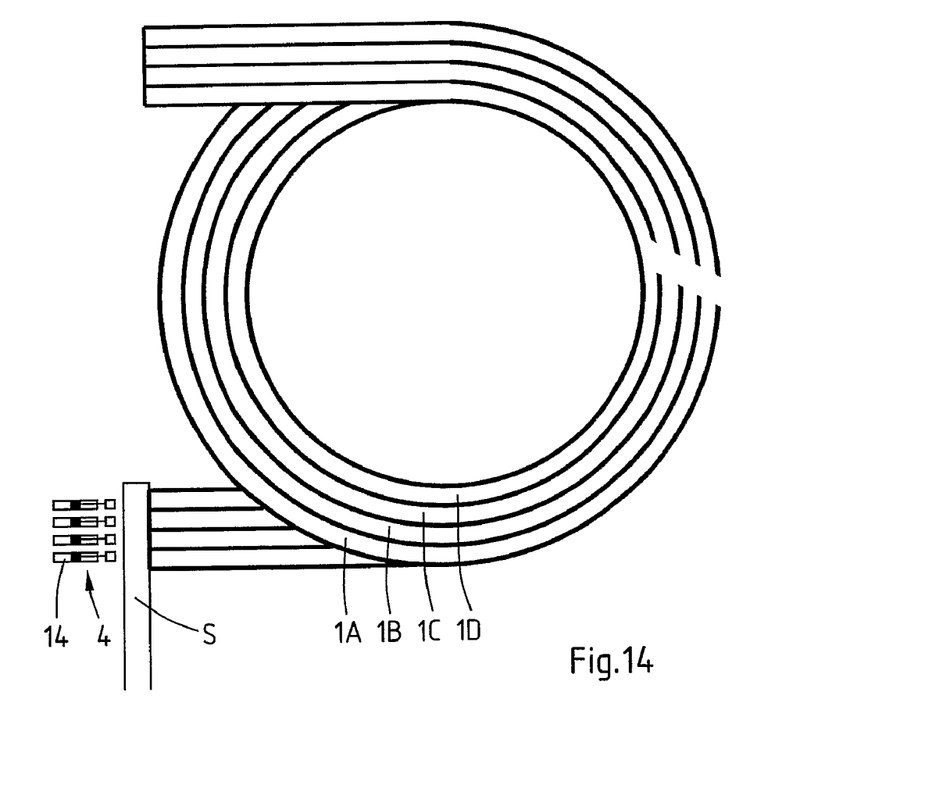

FIG. 14 shows an alternative embodiment having a relatively simple diverter 4. The diverter 4 comprises a plurality of pushing elements 14, in this case four pressing cylinders. Various embodiments of the pushing elements 14 are conceivable, for example compressed air cylinders. The products arriving from the supplying conveyor S are pushed by one of the pushing elements 14 onto one of the desired accumulating conveyors 1A-D. This embodiment is typically suitable for large products which can be diverted relatively difficult. Preferably, the products are sufficient stable in order to allow pushing them without falling down, for example. In this embodiment sensors may be applied to detect the location of the products on the supplying conveyor S.

Figure 15:
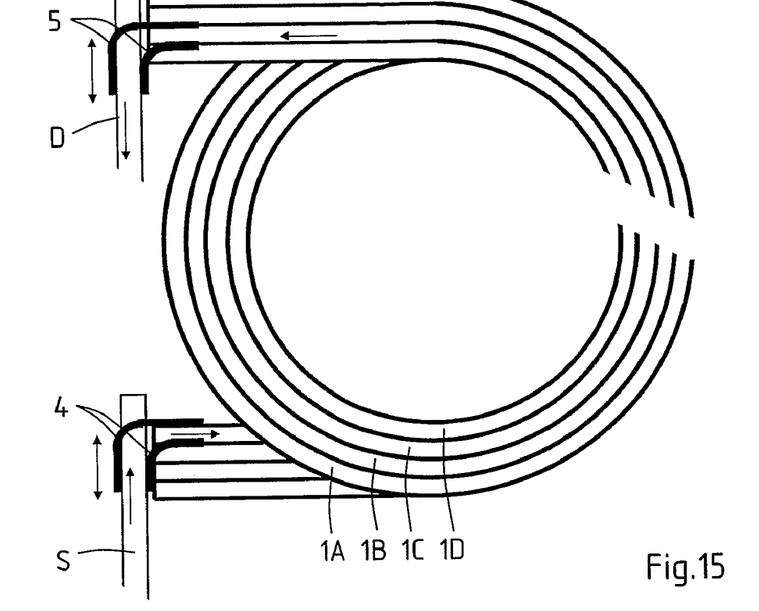

FIG. 15 shows an embodiment which is comparable to that of FIG. 9. However, in this case the products are guided between opposite walls of a guide of the diverter 4 and between opposite walls of a guide of the merging member 5. Guiding the products between walls is preferred for small products as the transferring process from the supplying conveyor S to the accumulating conveyors 1 appears to be more stabile. Furthermore, for small products the guides are preferably driven ones and/or the guides engage the products for conveying them. This can be achieved by a guide provided with an endless conveyor belt, for example.

Figure 16:
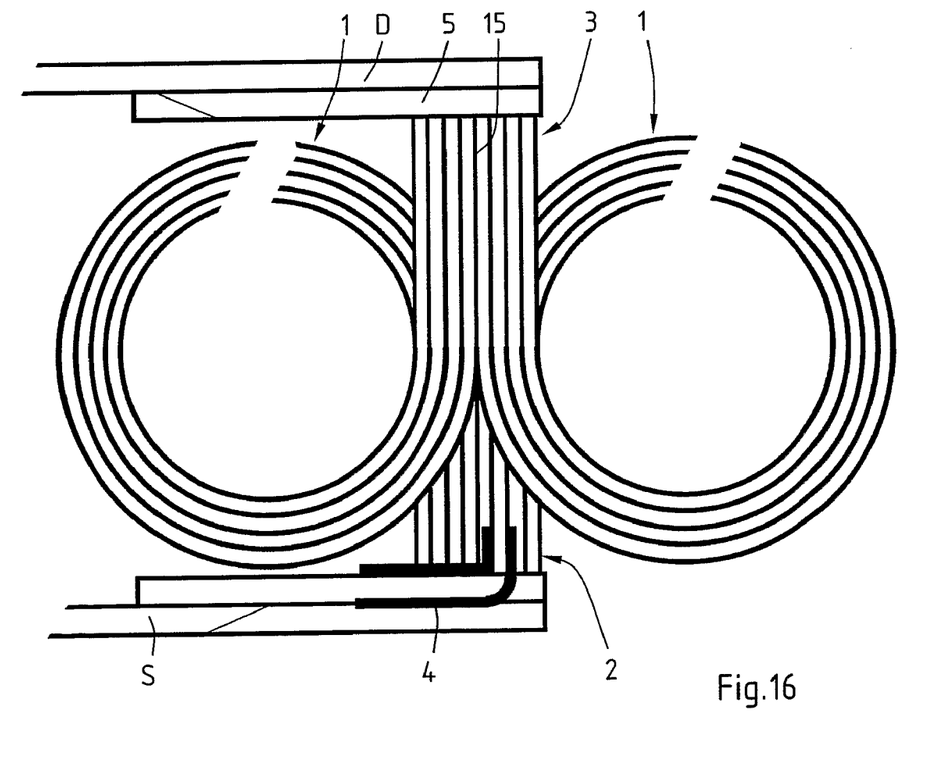

FIG. 16 shows an embodiment of which the helical paths are arranged parallel to each other. The diverter 4 is comparable to that in FIG. 15. In this embodiment the helical paths comprise each four parallel accumulating conveyors 1. The supplying conveyor S and the discharging conveyor D have opposite directions of conveyance, whereas the directions of conveyance thereof are perpendicular to that of the direction of conveyance at the supplying places 2 and the discharging places 3 of the accumulating conveyors 1. This embodiment is suitable for conveying mass flow products, for example small articles or bottles or the like. The products are diverted to a selected one of the accumulating conveyors 1 by the diverter 4. Preferably, a separation element 15 is disposed between the accumulating conveyors 1 for separating and/or guiding the products. In this case the merging member 5 may not be provided with separating elements, but of course, if desired the diverter mechanism may be mirrored to the merging member 5.

Figure 21:
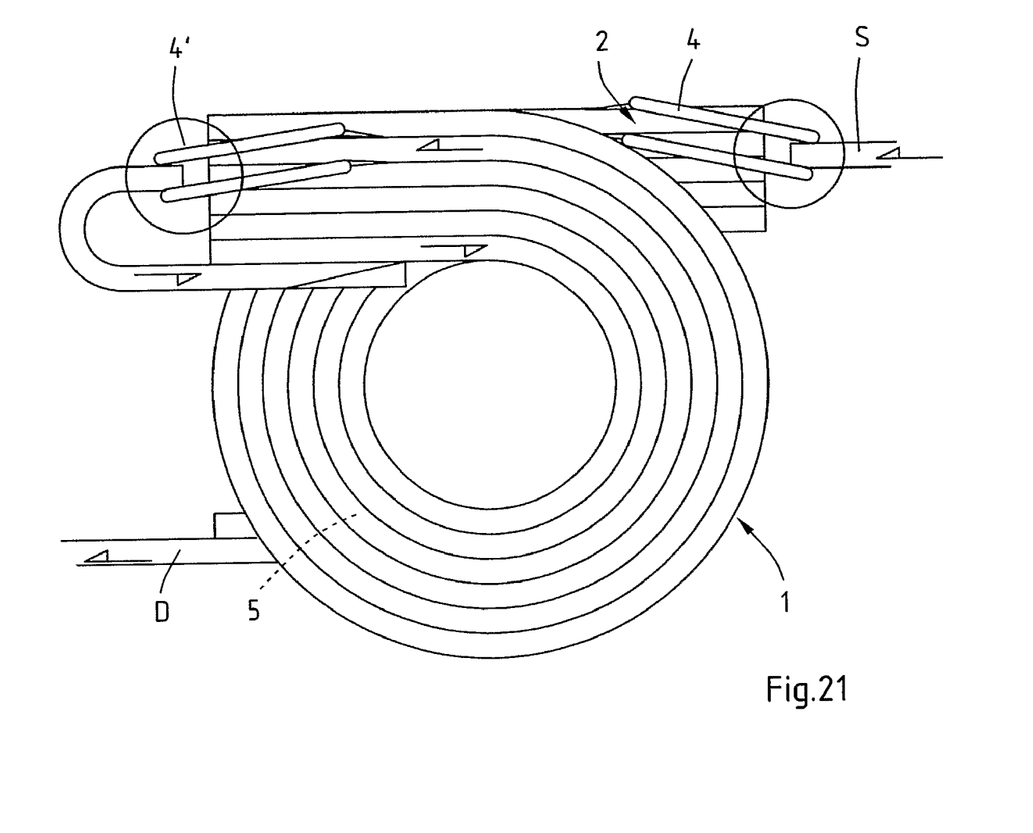

FIG. 21 shows an embodiment in which at an end portion of the helical path products are returned from an accumulating conveyor 1 directed upwardly to a moving accumulating conveyor 1 directed downwardly. Thus, in this embodiment at least two parallel accumulating conveyors (1) within the helical path have opposite directions of conveyance. The advantage of this embodiment is that the helical path is used very efficiently and the supplying places 2 and the discharging places 3 can be present in one plane substantially perpendicular to the central axis of the helical path. FIG. 21 shows that the embodiment is provided with a second diverter 4' which connects the associated accumulating conveyor tracks within the helical path.

It may be apparent that several aspects of the embodiments such as described above and shown in the drawings may be varied and combined with each other. The diverter 4 and merging member 5 may be similar but functioning in opposite direction, for example.

Of course, more different helical path shapes are conceivable. The accumulating conveyors may be parallel to each other in a straight part thereof. They may also have straight or bended portions in a horizontal or vertical plane, for example.

FIG. 17-20 show the diverter 4 and merging member 5 in more detail, respectively, which are formed as line diverters. Basically, the diverter 4 and the merging member 5 are arranged in a comparable way, but they are only mirrored with respect to each other so as to function in a reversed way. Hereinafter, particularly the diverter 2 is described. It should be noted that this description is also valid for a merging member 5.

The embodiment such as shown in FIG. 17-20 is formed as a rod conveyor, wherein the ends of a large number of rods 16 are connected to an endless conveyor 17, such as a chain, belt or the like. At least one of these endless conveyors 17 are driven via a return member 18, such as a sprocket wheel, by a driving motor, such as an electric motor 19. In the embodiment such as shown the return members 18 are coupled by means of a shaft 20, 21, such that both conveyors 17 are driven synchronously. The rods 16 support and guide supporting members 22, wherein two rods 16 guide a supporting member 22. The supporting members 22 may be formed of a slat, plate, block or the like which are elongated perpendicular to the direction of conveyance at the supplying end of the diverter 4. The supporting members 22 are slidable along the rods 16 independently from each other.

For guiding the sliding of the supporting members 22 a lower portion of a guide pin 23 which projects downwardly from the lower side of each supporting member 22 is received in a guide path 24. This guide path 24 is disposed as a single track at the supplying end of the diverter 4 (or the discharging end of the merging member 5) and divides then into branches 24' and 24" of which the number corresponds with the number of accumulating conveyors 1 which are connected to the diverter 4. At the discharging end of the diverter 4 (or the supplying end of the merging member 5) the position in transverse direction of the branch 24', 24" of the guide path 24 is such that the supporting members 22 and the selected accumulating conveyor are aligned.

The guide path 24 is provided with a switch 25 which is controlled by a control system of the device for buffering. The control system guides the guide pin 23 which moves through the switch 25 to the desired branch 24', 24" of the guide path 24 so as to convey products on the supporting members 22 to the accumulating conveyor 1 which is selected.

Figure 17:
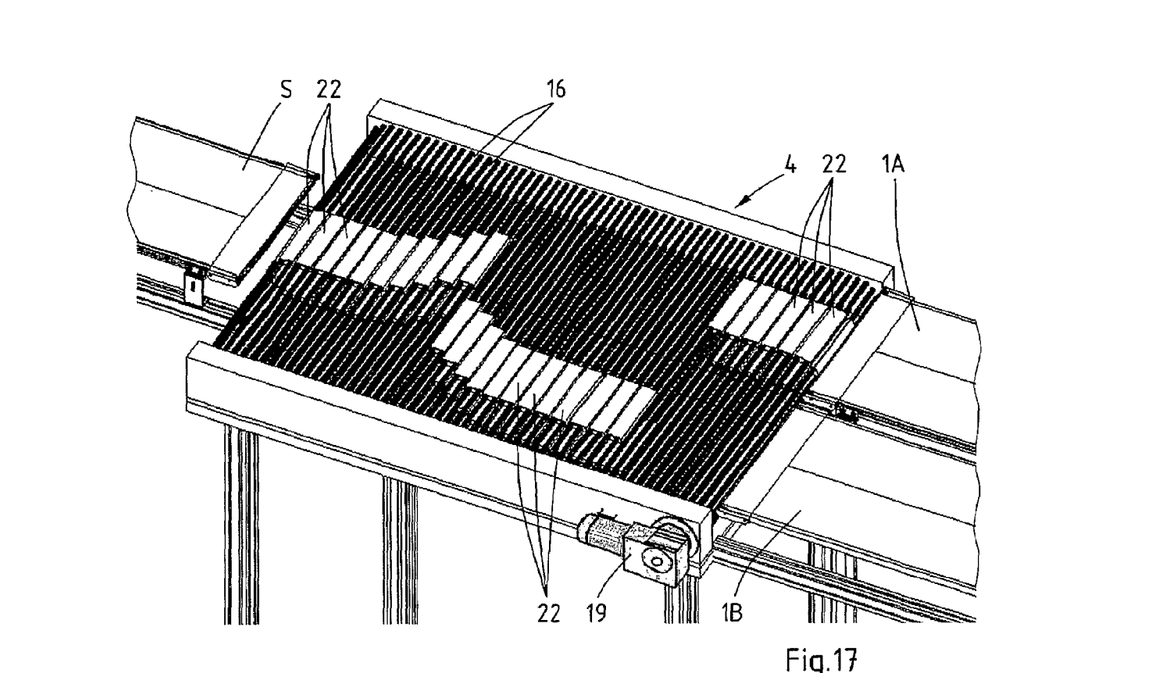
FIG. 17 is a perspective view of the diverter of the embodiment of FIG. 1 on a large scale.
Figure 18:
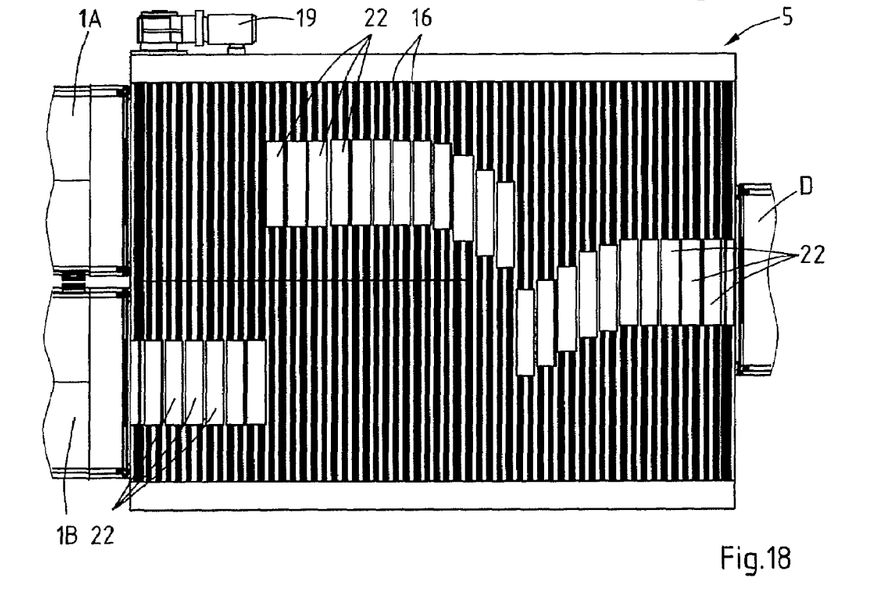
FIG. 18 is a plan view of the merging member of the embodiment of FIG. 1 on a large scale.
Figure 19:
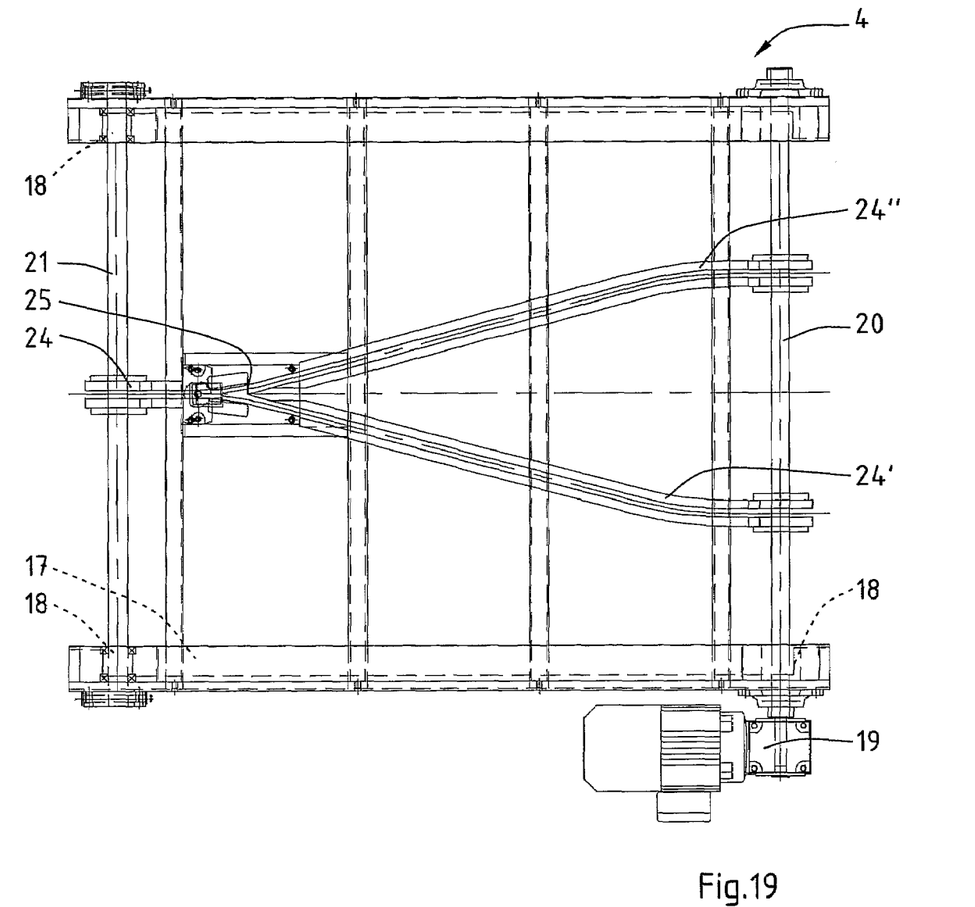
FIGS. 19 and 20 are a plan view and a side view, respectively, of an embodiment of the diverter of FIG. 17.
Figure 20:
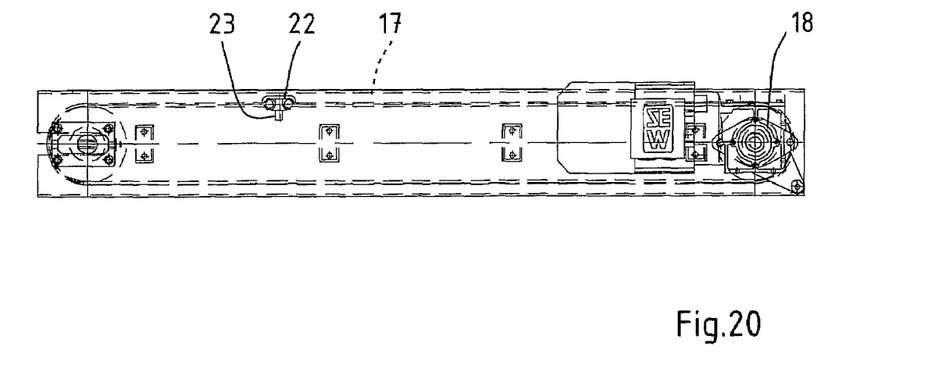

The supporting members 22 may be arranged to support one ore more products, or one or more supporting members 22 may support one product or a single group of products. Preferably, the branches 24', 24" of the guide paths 12 extend oblique over a distance which is as long as possible so as to achieve a transverse movement which is as smooth as possible. The transverse displacement of the supporting members 22 in the diverter 4 such as shown in FIG. 17 and 18 is achieved over a short distance with respect to that in the diverter 4 such as shown in FIGS. 19 and 20. This will also be dependent on the products which are conveyed and the requirements of the diverter 4 and the merging member 5.

In the embodiment such as shown the rods 16 have the function of conveyor and the supporting members 22 have the function of transversely moving carriers. Alternatively, it is also possible to apply a conveyor belt having a relatively smooth upper surface and pushing elements as means for transverse displacement, which may circulate together with the conveyor, on one hand, but may move over the upper surface of the conveyor in transverse direction of the conveyor so as to displace products on the diverter 4 in transverse direction to a position which is in alignment with the corresponding accumulating conveyor 1. These means for transverse displacement may be connected to the diverter 4 directly or may be part of a conveyor moving synchronously with the conveyor which conveyor is disposed above the diverter 4. In that case the means for transverse displacement may also engage the products from above and displace them in transverse direction, such as described hereinbefore with reference to the drawings 7 and 10-13.

From the foregoing it will be clear that the invention provides a compact device for buffering products. In a relatively simple way it provides the opportunity to buffer products in a reliable way for a variety of product types.

The invention is not restricted to the above-described embodiments as shown in the drawings. It may be apparent that various changes can be made in the embodiment without departing from the scope of the claims. For example, an embodiment having one accumulating conveyor in the form of a helical path and another one in a different shape is conceivable. Furthermore, the embodiments described above have a helical path including a central axis which extends upright. However, a device for buffering products including a helically shaped accumulating conveyor of which the central axis extends in a horizontal direction is also conceivable, for example in the field of conveying systems having product clamping elements such as for hanging garment, PET bottles, newspapers, magazines and the like.

It is also possible to connect the device for buffering products to supplying conveyors and discharging conveyors having a plurality of parallel product flows. The diverter and merging member could also be changed between the different supplying and discharging conveyors.

The invention claimed is:

1. A device for buffering products, comprising a plurality of accumulating conveyors, each having a supplying place configured to receive products and a discharging place configured to discharge products, an adjustable diverter connectable to a supplying conveyor for supplying the products in at least one flow, said diverter being connected to a selected one of the supplying places of the accumulating conveyors and configured to convey the flow of products to the corresponding accumulating conveyor, and a merging member connectable to a discharging conveyor and configured to convey the products in at least one flow, said merging member being connected to a selected one of the discharging places of the accumulating conveyors for conveying the products from the corresponding accumulating conveyor to the discharging conveyor, wherein the accumulating conveyors form at least a helical path.

2. The device according to claim 1, wherein the accumulating conveyors are disposed parallel to each other within at least the helical path.

3. The device according to claim 2, wherein an accumulating conveyor forms two parallel tracks within the helical path, wherein the directions of conveyance in the tracks are opposite to each other.

4. The device according to claim 1, wherein the accumulating conveyors form at least two helical paths which are arranged in series.

5. The device according to claim 4, wherein the supplying place and the discharging place of at least one accumulating conveyor are in a plane which is substantially perpendicular to the central axis, which is substantially parallel of the helical paths.

6. The device according to claim 1, wherein the accumulating conveyors form helical paths which are disposed in parallel to each other.

7. The device according to claim 1, wherein the helical path has a central axis which extends in an upright direction.

8. The device according to claim 1, wherein the diverter is a line diverter.

9. The device according to claim 1, wherein the diverter comprises a circulating conveyor having a direction of conveyance, and displacing members configured to displace the products perpendicular to the direction of conveyance towards a location which is connected to a selected one of the supplying places of the accumulating conveyors.

10. The device according to claim 1, wherein the diverter has a supplying end at which the direction of conveyance is substantially parallel to that in the supplying places of the accumulating conveyors.

11. The device according to claim 1, wherein the merging member has a discharging end at which the direction of conveyance is substantially parallel to that in the discharging places of the accumulating conveyors.

12. The device according to claim 1, wherein the direction of conveyance in a supplying end and a discharging end of the diverter, and in a supplying end and a discharging end of the merging member are substantially parallel as seen from above.

13. The device according to claim 1, and further comprising a cover configured to cover a gap between the supplying places and a discharging end of the diverter.

14. The device according to claim 13, wherein the cover is formed by a rotating endless conveyor belt which has a direction of conveyance perpendicular to that of the accumulating conveyors in the supplying places, and wherein the accumulating conveyors have a revolving wheel supporting an endless carrying surface of the accumulating conveyor at a location upstream of the supplying places, wherein a side edge of an upper part of the conveyor belt extends substantially parallel to a center line of the revolving wheel and said side edge is disposed above the wheel at such a position that an upper surface of the conveying belt is substantially flush with and close to an upper surface of the accumulating conveyors at the supplying places.

15. The device according to claim 1, wherein the helical path has a central axis, and the supplying place and discharging place of at least one accumulating conveyor are spaced from each other in a direction parallel to the central axis of the helical path.

16. The device according to claim 1, wherein the diverter comprises an adjustable engaging mechanism configured to engage at least a product and transferring the engaged product to the selected one of the supplying places of the accumulating conveyors.

17. The device according to claim 16, wherein the engaging mechanism is arranged such that it transfers at least a product over a gap between the diverter or the supplying conveyor and the accumulating conveyors.

18. The device according to claim 16, wherein the diverter is provided with a telescopic mechanism for extending the engaging mechanism in at least the direction of conveyance of the accumulating conveyors.

19. The device according to claim 18, wherein the engaging mechanism comprises an endless conveyor belt, which runs over revolving wheels, which revolving wheels are displaceable with respect to each other by the telescopic mechanism.

20. The device according to claim 1, wherein at least a helically shaped accumulating conveyor comprises an endless conveyor member which is at least radially supported and guided by guide rollers.

21. The device according to claim 1, wherein a plurality of accumulating conveyors are driven by a single driving means via a transmission which is arranged such that one of the selected accumulating conveyors is driven by the driving means.

22. The device according to claim 1, wherein a transmission connects a drive device of the supplying conveyor or discharging conveyor to one of the selected accumulating conveyors so as to drive the selected accumulating conveyor by the drive device.

23. The device according to claim 1, wherein a separation element is disposed between adjacent accumulating conveyors.

24. The device according to claim 1, wherein at least a sensor is disposed near at least a discharging place so as to detect whether a product is present at that location.

25. The device according to claim 1, wherein each of the accumulating conveyors forms at least a helical path.

26. A method for buffering conveyed from a supply conveyor, comprising: providing a plurality of accumulating conveyors formed in a helical path, each of the accumulating conveyors having a supplying place configured to receive products and a discharging place configured to discharge products; receiving products from the supply conveyor in at least one flow; diverting a product to a selected one of the supplying places of the accumulating conveyors; and merging product from a selected discharge place in at least one flow to a discharge conveyor.

27. The method according to claim 26 wherein diverting comprises engaging the product with an engaging mechanism and transferring the product to the selected one of the supplying places of the accumulating conveyors and then disengaging the product from the engaging mechanism.

28. The method according to claim 27, wherein the product speed and direction before disengagement of the product are synchronized with the speed and direction of conveyance of the selected accumulating conveyor at the corresponding supplying place, respectively.

* * * * *